Oct. 5, 1948.  H. BRAMMER  2,450,576

BELTING

Filed July 18, 1944  2 Sheets-Sheet 1

Inventor:
Harry Brammer,
by Pierce & Scheffler,
Attorneys.

Oct. 5, 1948. H. BRAMMER 2,450,576
BELTING
Filed July 18, 1944 2 Sheets-Sheet 2

Inventor:
Harry Brammer,
by Pierce & Scheffler,
Attorneys.

Patented Oct. 5, 1948

2,450,576

UNITED STATES PATENT OFFICE 2,450,576

BELTING

Harry Brammer, Leeds, England

Application July 18, 1944, Serial No. 545,476
In Great Britain July 16, 1943

9 Claims. (Cl. 74—236)

This invention relates to power transmission belting of the type having transverse corrugations formed throughout its length and especially to belting of the type described in my prior British Patents Nos. 301,602 and 405,375.

In the first named patent the belt is described as being formed of two rows of short pieces of leather bent or folded into shape of an arch, with the crowns of each row of arches alternately opposite to each other so that the free ends of one row of arches pass into the recesses of the opposite row, the ends of the two rows being retained in position by a coiled spring arranged to pass through circular holes formed in the ends of the several arches; the coiled spring being provided with nuts and a hook and eye at its ends for securing them together. In the latter patent lengths or strips of material are folded transversely at intervals to form corrugations on the top and bottom faces of the belt and the corrugations are maintained by a chain-like element running longitudinally through the belt.

The object of this invention is to provide an improved form of belt fastener and also improved belting.

Accordingly the belting is retained in its assembled or finished form by belt fasteners which are located in the transverse walls of the belting between the corrugations and each comprises a longitudinally extending piece with ends adapted to retain said transverse walls on the fastener. The ends of each of the fasteners may extend in opposite directions or both in one direction.

The invention includes flexible belting wherein the belt fasteners are located in the side edges of the transverse walls on both side faces of the belting. Moreover the ends of the fasteners may extend inwardly across the walls of the belting from the side faces.

According to a feature of the invention the belt fasteners are of flat strip or wire formation with integral or separate ends.

A belt fastener may comprise a body portion with separate or integral ends adapted to form shape maintaining or filler members to enter the belting from each side face.

Referring now to the accompanying drawing in which several embodiments of the invention are shown by way of example only:

Figure 1:
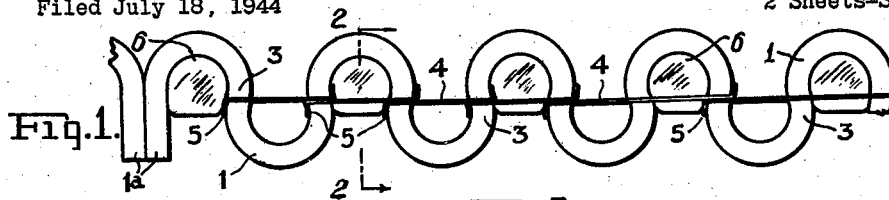
Fig. 1 is a side elevation of an improved V-belt of corrugated formation.
Figures 2, 4, 5:
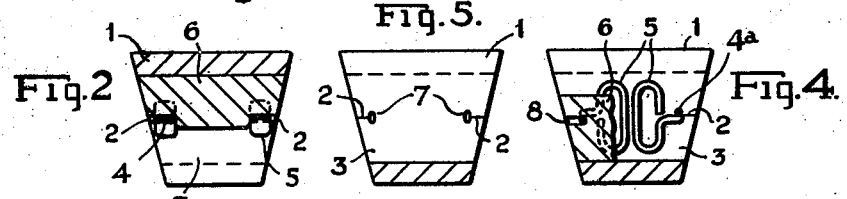
Fig. 2 is a sectional view on line 2—2 of Fig. 1.
Figs. 4 and 5 are respectively sectional views on line 4—4 of Fig. 3 with and without the belt fasteners in position.

The belting in the construction shown in Figs. 1 and 2 is formed from one or more long strips 1 of material, e. g., rubber textile material, leather or the like, folded or bent to form transverse corrugations on the top and bottom faces of the belting. To retain the corrugations, slits 2 are formed in the side edges of the transverse walls 3 of the belting and a series of flat strip belt fasteners 4 are slipped therein to extend longitudinally of the belting for tying the walls 3 together. The ends 5 of the fasteners are turned up and down respectively to bear against the faces of the said transverse walls and the fasteners may each be of a length to retain one or more corrugations as illustrated. Moreover the ends of the body portions of the fasteners overlap one another in some or all of the slits depending upon the type of fastener in use which may be all of one type or a combination as shown.

Some (or all) of the corrugations are filled with transverse filler members 6 which are cut away at each end to be held in position by the fasteners 4, but may serve to hold the fasteners by small nails or other means being passed through the fasteners into the members or by driving parts of the fasteners into said members. The ends 1a of the belt are secured together in any desired manner.

Figure 3:
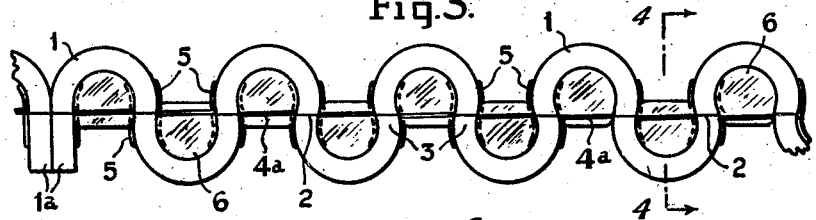
Fig. 3 is a side elevation of a modified form of V-belt.

In the modification shown in Figs. 3 to 5 the fasteners 4a are of round, square or other section wire and pressed through slits 2 in the edges of the aforesaid transverse walls into holes 7. This form of fastener has its ends 5 shaped, e. g., in the form of a flat loop, to provide a good bearing area and adapted to assume a vertical position. The flat loop ends 5 conform to the shape of the walls 3 (Fig. 3) and serve to maintain the desired formation of belting. The filler members 6 (which in some belts are dispensed with) have slits 8 in their ends to receive the fasteners. Alternatively, two short filler members, secured to, or integral with, the fastener body portions to form its ends, could enter each desired corrugation from the side faces of the belting to meet in the centre of the corrugation. Also the ends 1a of the belt are secured by the fasteners 4a although other fastening means may be employed.

The size, shape and distance between corrugations in the above types of belting may be modified without departing from the scope of the invention.

Figure 6:
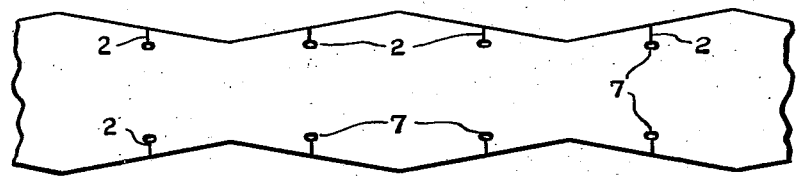
Fig. 6 is a plan of a strip of material cut to form a V-belt.

To make the above belting fit V-pulleys it may be shaped after or prior to assembly. For the latter the edges of the strips 1 may be vandyked as shown in Fig. 6 or of undulating formation. If desired the belting may be of square section or rope like, i. e. substantially circular in cross section.

Figure 7:
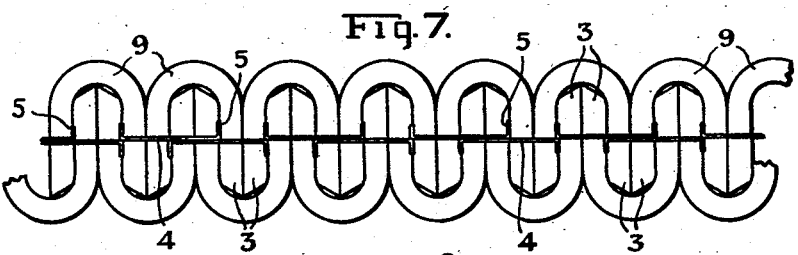
Fig. 7 is a side elevation of an improved corrugated V-belt built up of short pieces.

Belting could be formed as shown in Fig. 7 of short pieces 9 folded and fitted together in the form of two rows of U-shaped pieces of which the upper row is inverted. Such pieces are held together by strip fasteners 4 located in slits in the edges of the transverse walls 3 in a similar manner to that described. The ends 5 of each fastener in this case are turned in one direction.

In any of the above constructions bearing washers or members may be fitted between the ends 5 of the fasteners and the belting.

Figure 8:
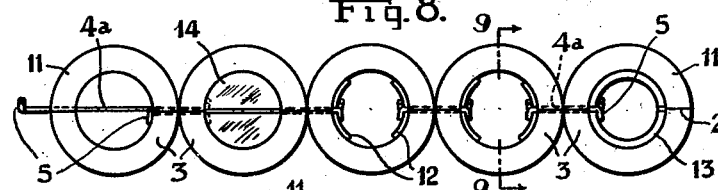
Fig. 8 is a side elevation of an improved corrugated V-belt built of tubular pieces.
Figure 9:
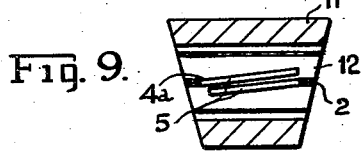
Fig. 9 is a sectional view on line 9—9 of Fig. 8.

In a further modification shown in Figs. 8 and 9 the belting is formed of tubular pieces 11, cut from a length of reinforced or other tubing or hose (or fabricated), which are placed side by side to form a transversely corrugated length. The pieces are secured together by any of the aforesaid fasteners, or by wire fasteners 4a, which may simply anchor adjacent transverse walls 3 together, or extend across one or more tubular pieces and through the walls. Both arrangements may be combined as shown or one form of fastener used throughout the belt. The ends 5 of the fasteners are of straight formation and may bear against the inner faces of the transverse walls, or against raw hide or other bearing members 12, which may also serve to stiffen and/or retain the shape of the tubular pieces. Tubular filler members 13, or solid members 14 may be fitted into some or all of the tubular pieces 11. Alternatively, the ends 5 could be as shown in Fig. 4.

Figure 10:
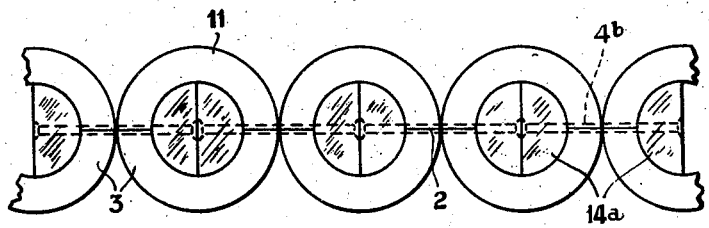
Figs. 10 and 11 are respectively a side elevation and a part sectional plan of a modified V-belt built up of tubular pieces.
Figure 11:
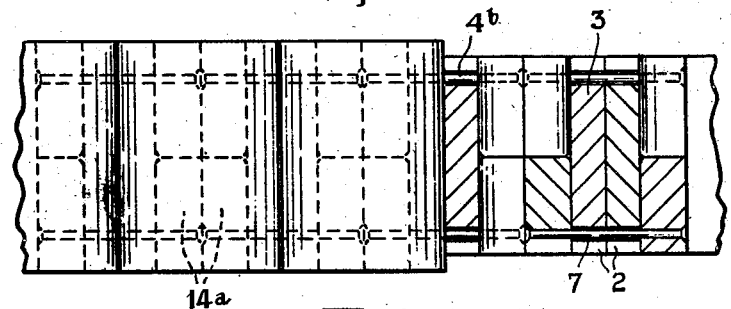
Figure 12:
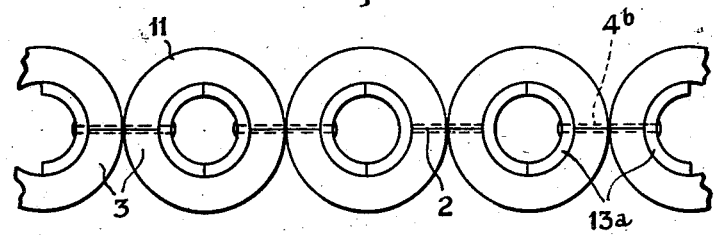
Figs. 12 and 13 are respectively a side elevation and a part sectional plan of a further modified V-belt built up of tubular pieces.
Figure 13:
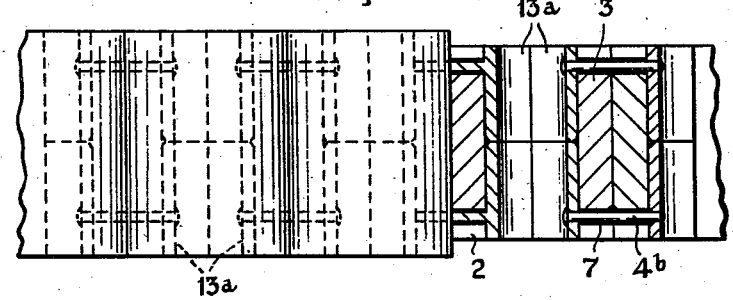

In Figs. 10 to 13, tubular pieces 11 are secured together by modified fasteners 4b. In Figs. 10 and 11 each fastener comprises a body portion with a solid semi-cylindrical filler member 14a riveted thereto at each end. These fasteners are pressed into position from each side face of the belting until their body portions enter the holes 7 and each tubular piece is filled with four filler members 14a. Gaps could be left between the members if desired. Also the filler members could be integral parts of the fasteners. In Figs. 12 and 13 the construction is modified by making the filler members 13a of semi-cylindrical formation so that a tubular member of four parts is built up in each tubular piece 11. The members 13a are integral, or separately riveted on parts of the fasteners 4b. Gaps could be left between the members 13a so as to provide shape maintaining members instead of complete tubular filler members.

What I claim and desire to secure by Letters Patent is:

1. Power transmission belting comprising a plurality of hollow semi-cylindrical portions of flexible sheet material arranged side by side with their axes parallel to form a strip, said portions presenting successions of convex surfaces of said semi-cylindrical portions on two opposite sides of said strip, alined openings in the end edges of said semi-cylindrical portions, and fastening means seated in said openings, said fastening means each comprising a rectilinear portion extending longitudinally of said strip through walls of at least two contiguous semi-cylindrical portions.

2. Belting as defined in claim 1 in which the successions of semi-cylindrical portions are the successive reverse turns of a continuous flexible strip.

3. Belting as defined in claim 1 in which the successions of semi-cylindrical portions are the rounded ends of U-shaped members.

4. Belting as defined in claim 1 in which the successions of semi-cylindrical portions are the rounded ends of U-shaped members, the space between the legs of each U-shaped member being occupied by the contiguous legs of two oppositely disposed U-shaped members.

5. Belting as defined in claim 1 in which the successions of semi-cylindrical portions are the opposite halves of cylindrical members positioned side by side.

6. Belting as defined in claim 1 in which the semi-cylindrical portions contain shape maintaining filling members.

7. Belting as defined in claim 1 in which the fastening means comprises end members engaging the inner surfaces of the semi-cylindrical portions and serving to limit the spacing and maintain the shape thereof.

8. Belting as defined in claim 1 comprising curved bearing members seated on the concave surfaces of the semi-cylindrical portions and held in place by the fastening means.

9. Belting as defined in claim 1 in which the fastening means each comprises a rectilinear portion and integral end portions shaped to seat against the inner surfaces of the semi-cylindrical portions and serving to maintain the shape thereof.

HARRY BRAMMER.

REFERENCES CITED

The following references are of record in the file of this patent:

UNITED STATES PATENTS

| Number | Name | Date |
|---|---|---|
| 2,025,007 | Wendling | Dec. 17, 1935 |
| 2,231,920 | Kelly | Feb. 18, 1941 |

FOREIGN PATENTS

| Number | Country | Date |
|---|---|---|
| 182,509 | Great Britain | July 3, 1922 |
| 209,145 | Great Britain | Dec. 31, 1923 |
| 269,659 | Great Britain | Apr. 21, 1927 |
| 301,602 | Great Britain | Dec. 6, 1928 |
| 405,375 | Great Britain | Feb. 8, 1934 |
| 834,049 | France | Aug. 1, 1938 |